March 12, 1968

S. O. RAYMOND ETAL 3,372,760

FREE-FALL CORE SAMPLER

Filed March 30, 1965

INVENTORS
SAMUEL O. RAYMOND &
BY   PETER L. SACHS

ATTORNEY

March 12, 1968  S. O. RAYMOND ETAL  3,372,760
FREE-FALL CORE SAMPLER

Filed March 30, 1965  2 Sheets-Sheet 2

INVENTOR.S
SAMUEL O. RAYMOND &
BY PETER L. SACHS

ATTORNEY 3,372,760
FREE-FALL CORE SAMPLER
Samuel O. Raymond, North Falmouth, and Peter L. Sachs, Reading, Mass., assignors to the United States of America as represented by the Secretary of the Navy
Filed Mar. 30, 1965, Ser. No. 444,094
13 Claims. (Cl. 175—5)

ABSTRACT OF THE DISCLOSURE

The free-fall corer apparatus of the present invention consists of an expendable, elongated casing having an annular-shaped ballast member secured thereto. A cylindrical housing surmounts this ballast member and accommodates a float which is tied to the core liner. During descent of the apparatus, the float is latched to the ballast element, but when the apparatus strikes bottom, a pilot weight suspended from the float latching means moves upwardly and allows the float to freely ascend within the ocean. This ascent unlatches the core liner from the expendable casing and the former is thereafter raised to the surface.

---

The present invention relates generally to oceanographic equipment and, more particularly, to apparatus for procuring sediment samples from suboceanic areas.

Freely descending and ascending instruments for obtaining cores of the sediment at extreme ocean depths have been developed in the recent past. The mode of operation of these so-called "free-falling corers" is essentially as follows. First, the unit, which is self-contained, is dropped free at the ocean surface. Because it is heavier than the water it displaces, it descends to the ocean floor and, in penetrating the sediment layer, it encompasses a sample of the sediment. Thereafter, a portion of the apparatus, the core liner, with the extracted core accommodated therein, is decoupled from the ballast member and returned by a float to the surface. Left behind and embedded in the ocean floor is the expendable portion of the unit which includes the outer casing and the ballast member surmounting it.

Compared with conventional wire-line core samplers, the free-fall apparatus has several important advantages which recommend its use in oceanographic research. For example, the instrument operates independent of the ship's movement and, therefore, it can be used in those applications which require the sampling or measuring device to move only in a vertical direction or remain undisturbed on the ocean bottom. Since there is no need for a heavy supporting cable with these corers, sampling operations can be carried out from relatively small vessels. Also, accurate positioning, precise sampling depths and close spacing of sampling stations, even in relatively deep water, are possible. Furthermore, once the corer is launched, no further supervision is required and other oceanographic work can be accomplished by the ship's personnel.

Free-fall devices, moreover, usually have high rates of descent and ascent and, thus, the time required for procuring a sample is considerably less than that needed with wire-controlled equipment. Launching and retrieval times also are short with respect to the instrument's round-trip travel time and, therefore, little additional time is required to obtain multiple samples.

Additionally, the maximum depth of a sampling site or station is not limited by the strength or length of a supporting cable and, because of this, the free-fall corer can be utilized at any depth. Besides eliminating the supporting cable, these devices also do away with the need for expensive bottom signalling systems for there is never any uncertainty about their making bottom contact.

There are, however, certain disadvantages attending the use of free-fall instruments, and they stem primarily from two sources. First, the bulk and weight required to provide flotation for a small payload is considerable. For example, when gasoline is used in a deep submersible float, such as is the case in one prior art model, the ratio of weight-in-air to buoyancy force is greater than three to one. Relatively large quantities of gasoline, therefore, must be carried and stored in the research vessel with the attendant hazards involved. Added to this danger is the design of the float itself which necessarily must be of lightweight construction. Also, since approximately 3.5 liters of gasoline are required for one kilogram of buoyancy, these floats become bulky and cannot be incorporated into a hydrodynamically efficient or streamlined package.

Another disadvantage is the relatively small buoyancy of the recoverable portion of the unit which seriously restricts the type of locating aid which can be employed for facilitating the recovery operation. Additional buoyancy must be built into the payload for such passive locating aids as radar reflectors or flags, and this further adds to the difficulty of streamlining the overall package. Active recovery aids, such as sonar or radar transmitters, which must be of miniaturized, lightweight and reliable construction, substantially increase the cost of manufacturing the equipment.

In the past, some of the prior art free-fall corers have resorted to a time delay release mechanism for uncoupling the payload from the ballast which requires the electrochemical action of seawater to erode a latch member. With this type of release, the length of time the corer is in the sea is controlling and, consequentially, the release time differs for varying depths. Hence, there is always some uncertainty about the surfacing time of the payload.

It has been found that if a bottom contact release of the type having a pilot weight suspended from the corer is employed, the attitude of the sampler as it descends through the water depends upon the position of this weight. For example, when concrete ballast was used with a gasoline float and attempts were made to streamline these components, the sampler did not fall nose first with the pilot weight in certain positions because the center of gravity in water was located very near or above the center of drag. Successful operation of the sampler, of course, requires that it enter the sediment vertically, or nearly so, and if only partial penetration is achieved, that the apparatus remain vertical without toppling over. It has been found that if the sampler enters the bottom at angles greater than twenty degrees with respect to the vertical the core liner will not be completely withdrawn from the casing wil become locked in a half extracted position.

Also, with the pilot weight type of release, tests have disclosed that when the upper portion of the sampler is streamlined to increase the descent velocity, there is a tendency for the pilot weight to kite and cause premature release of the float.

The present invention, as will be seen hereinafter, eliminates or minimizes some of the above undesirable characteristics of the prior art free-fall corers by utilizing as the control component of the payload release mechanism a dense, streamlined, cylindrical pilot weight which is mounted concentric with the outer casing at the impact end thereof and adapted to be displaced upwardly therealong when the corer enters the sediment layer. With the pilot weight so positioned, the overall unit is nose heavy. Also, it is long and nearly symmetrical about a vertical axis. Hence, it invariably falls straight and comes to rest in the sediment in a vertical position.

Also, instead of using a gasoline-filled float as the buoyancy member, the present invention makes use of a pair of hollow glass spheres, one of which is empty and the other of which contains an electronic flashing light. During the descent phase of the corer, these spheres are accommodated within a protective housing which forms the upper part of the expendable subassembly, and they are secured to the core liner by means of a coiled line. This line, as it uncoils, functions as the time delay mechanism whereby the core liner is withdrawn from the casing a given time after the sampler enters the ocean floor. It also permits the deceleration of the float to be used to detach the core sample from the sediment layer. The float is additionally latched to the housing by a lever arrangement which is released when the pilot weight encounters the sediment and is, in effect, displaced upwardly along the casing by the resistance this layer presents to any downward movement of the weight. Also, in order to prevent premature release of the float on deck or during launching, a pressure-sensitive element in the form of a hollow, flexible ball is inserted into the housing, jamming the float release mechanism in a locked condition. This ball collapses when the apparatus reaches a predetermined depth and floats away from the release mechanism, leaving the apparatus ready for operation as soon as it hits the ocean floor.

When the corer strikes the ocean floor, the cylindrical pilot weight slides upwardly along the outer casing. The float raises its restraining latch and frees itself. As it rises, the line which ties it to the liner commences to uncoil, and the time required for this line to uncoil, which is the delay time of the apparatus, allows the corer to come to rest in the sediment. When the line becomes taut, the float decelerates and jerks a liner release pin out of a locking engagement with the casing, breaks off the core and, in one embodiment, closes a shut-off valve which seals off the top of the liner against any entry of seawater. Finally, the liner itself is withdrawn from the casing and carried to the surface by the ascending float.

It is accordingly a primary object of the present invention to provide improved apparatus for procuring sediment samples from suboceanic structures.

Another object of the present invention is to provide a free-fall type of sediment sampler which has a high rate of descent and ascent.

A still further object of the present invention is to provide a freely descending and ascending instrument for obtaining core samples of suboceanic areas whose operation does not involve the use of inherently dangerous substances for obtaining the buoyancy required for returning the payload.

A still further object of the present invention is to provide a free-fall corer of streamlined and symmetrical shape which invariably descends in a proper attitude and enters the ocean floor at a substantially vertical angle.

A yet still further object of the present invention is to provide a sediment sampler of the free-fall type wherein the float release mechanism improves the hydrodynamic performance of the overall unit.

A still further object of the present invention is to provide a highly reliable apparatus for procuring marine earth cores at any ocean depth wherein the recoverable portion thereof can be readily located.

A yet still further object of the present invention is to provide a free-fall corer wherein the flotation means for returning the payload to the surface serves to part the core sampler and timely remove the core liner from the expendable casing.

A yet still further object of the present invention is to provide a free-fall corer for obtaining sediment samples of the ocean bottom wherein the release mechanism is impact operated.

Other objects, advantages and novel features of the invention will become apparent from the following detailed description of the invention when considered in conjunction with the accompanying drawings wherein.

Figure 1:
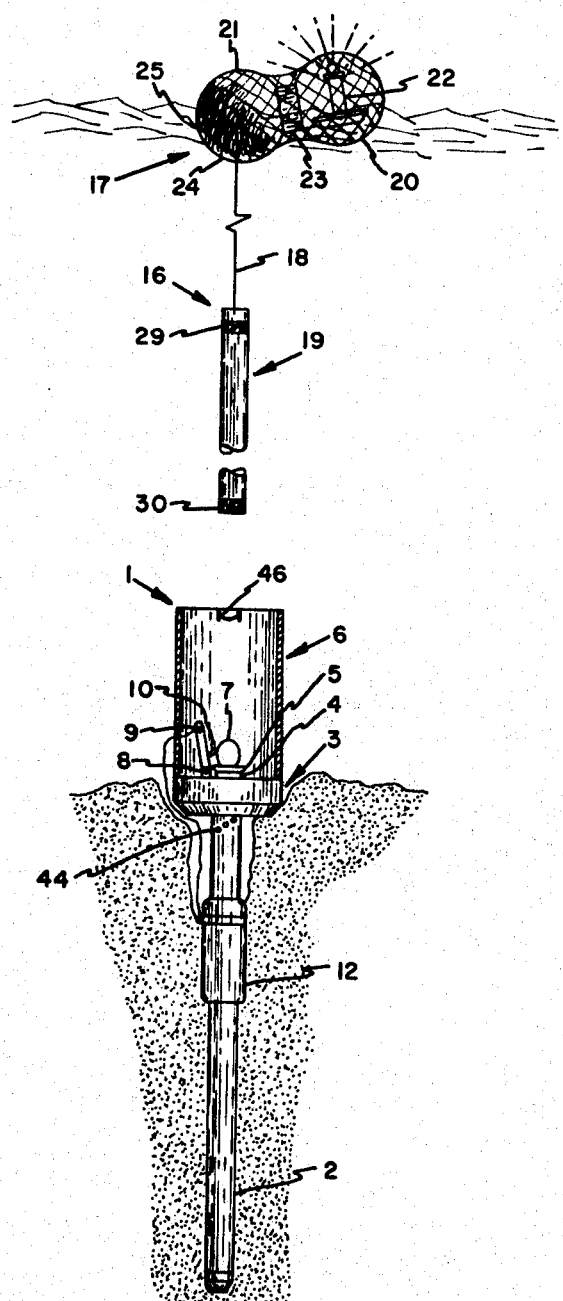
FIG. 1 illustrates the apparatus after a sample has been procured with the expendable portion embedded in the sediment and the payload floating on the surface.

Referring now to the drawings and, more particularly to FIG. 1 which illustrates the condition of the apparatus after a sediment sampler has been extracted and the payload has reached the surface, it will be seen that the expendable portion of the corer 1 includes an outer casing or barrel 2 having an annular-shaped iron ballast member 3 secured thereto, such as by welding, at a location slightly spaced from one end thereof. The short length of barrel 4 which extends beyond the top surface of ballast element 3 has a flared terminal portion 5 for guiding the core liner in place when the apparatus is initially assembled. Surmounting ballast element 3 is a cylindrical housing or shell 6 which, as will be seen hereinafter, accommodates and protects the float apparatus during the descent phase of the sampling operation. Shell 6 is provided with a plurality of handholes 7, and one of these holes, as seen in FIG. 2, through which a float release lever projects 9, has a hollow, rubber ball jammed therein for preventing premature release of the float while the apparatus is on deck or being launched at the sea surface.

Secured to the top surface of ballast member 3 is an upstanding bracket 8, and pivotally connected to this bracket is the float release lever 9 which has an L-shaped latch 10 fastened thereto at a point intermediate its length. This latch locks the float apparatus in place until the proper time in the sampling operation. Float release lever 9, as perhaps best shown in FIG. 2, extends through one of the handholes 7, and suspended from the extremity of this lever by a suitable wire 11 is a streamlined, lead pilot weight 12. This weight, as mentioned hereinbefore, is concentrically disposed about barrel 2 at a point adjacent the impact end of the corer. Because of this discussion of the pilot weight, the overall apparatus is nose heavy in water and, consequently, it invariably falls in the proper attitude to hit the ocean bottom at a substantially vertical angle. When the barrel 2 pierces the sediment layer, the friction that pilot weight 12 thereafter encounters results in its being displaced upwardly to an intermediate position along the barrel as this member continues to travel downwardly until stopped, for example, by the bottom of ballast member 3 hitting the ocean floor.

In order to assist its penetration of the ocean floor, barrel 2 is provided with a nosepiece 13 which has a leading conical section 14 which makes an angle of approximately ten degrees with the vertical, a dimension approximating the ideal clearance suggested by Hvorslev and Stetson for core tube noses. Nosepiece 13, as shown in FIG. 3, has an inner recess portion 15 which is suitably chamfered to guide and center the core liner when it is introduced into barrel 2 during the assembly operation.

Figure 2:
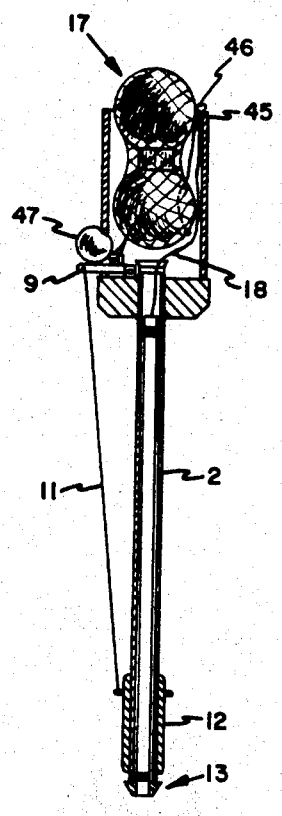
FIG. 2 illustrates the free-fall corer assembled and ready for launching.

The payload portion of the sampler, generally represented by reference character 16, includes, as is best shown in FIG. 2, a float 17 which is attached by a suitable length of line 18 to the core liner 19. Float 17, as alluded to hereinbefore, has as its buoyancy elements two hollow borosilicate glass spheres 20 and 21, one empty and the other containing an electronic flashing unit 22 of conventional design. Sphere 21, the empty one, consists of two permanently fused hemispheres, whereas sphere 22 consists of two separable hemispheres, the seal between which is made by their ground glass rim surfaces lubricated with silicone grease. These two hemispheres are aligned and held together by a pair of padded hose clamps, not shown. A polyvinyl chloride spacer ring 23 separates the spheres, and both spheres are retained in the side-by-side relationship by means of a knotted nylon net bag 24. This bag not only protects the glass floats but it also simplifies the problem of attaching the float itself to the float release mechanism. In this connection, a short, nylon loop 25 is knotted to nylon net bag 24, and this loop, as perhaps best seen in FIG. 2, is engaged by the L-shaped catch 10 carried by float release lever 9 when the corer is assembled in its standby condition. The nylon net bag also provides a convenient means for recovering the float, and this can be done with a simple, hooked wire. Additionally, it serves as a handle for carrying the float around aboard ship.

In one embodiment of the invention, the electronic flash unit accommodated within sphere 20 had a magnetically actuated reed switch in the energization circuit whereby the battery powering the flasher could be turned on and off by external magnetic means. Another model employed a mercury switch for this same purpose. This switch was held in an "off" position by orientating the float in a particular attitude when not in use.

Figure 3:
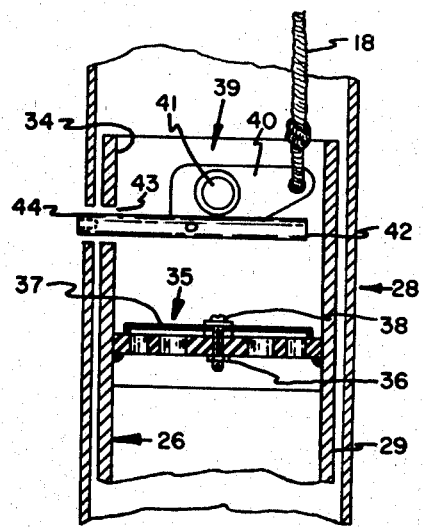
FIG. 3 shows details of the core liner and the manner in which it is secured to the core casing.
Figure 3:
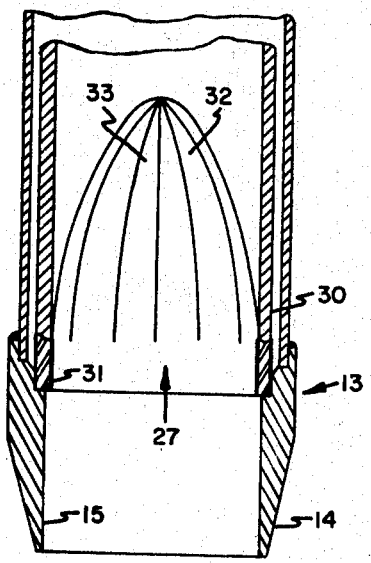

The core liner 19, as best seen in FIG. 3, consists of three subassemblies, a core retainer 26, a core catcher 27 and a liner release 28. These subassemblies are held together in an end-to-end fashion by several turns of wide pressure-sensitive tape 29 and 30 wound about and overlapping their abutting ends. This tape, which is applied when the outer wall surfaces of the subassemblies are dry and clean, is waterproof and of high breaking strength. By utilizing tape as the interconnecting means, the core liner, after recovery, can be quickly disassembled, the core retainer 26 containing the sample (or core) removed and the unit reassembled with an empty core retainer 26 and inserted into a second casing.

Core catcher 27, which is of conventional design, includes a ring element 31 which has a multiplicity of stainless steel, spring-leaf sectors, such as 32 and 33, affixed to its inner surface. These springs, which project upwardly into the lower portion of the section 26 when these two subassemblies are interconnected, form a domelike structure which, it will be appreciated, opens when the sampler penetrates the sediment layer to allow the core sample to enter the interior of section 26 and thereafter closes to prevent the entrapped sample from falling out of the otherwise open end of the core liner when this unit is withdrawn by float 17 and brought to the sea surface. Ring 27 seats within the recess 15 cut in nosepiece 13. The diameter of core liner 19 is such that there is a two-millimeter annular space between it and barrel 2 when the apparatus is in its standby position. This space facilitates the withdrawal of the liner assembly after the sample has been procured.

Liner release subassembly 28 includes a sleeve 34 having a check valve 35 effectively closing the lower end thereof. This check valve, which can be of conventional design, in the particular arrangement shown, includes a perforated polyvinyl chloride disk 36 having an elastic neoprene disk 37 centrally fastened to its top surface by fastening means 38. This valve, it will be understood, allows a unidirectional flow of water to take place upwardly from section 26 out into the surrounding sea when the corer pierces the sediment layer and the seawater within its interior is displaced by the core sample. Once the sampler comes to rest, valve 35 returns to its closed condition and thereafter prevents any seawater from entering the core liner and washing away any of the core sample.

Positioned within an upper portion of sleeve 34 is the core liner release mechanism 39. This mechanism includes a release lever 40 pivotally mounted about a stub shaft 41 that is attached to the inner wall of sleeve 34. A release pin 42 is secured to the short arm of lever 40, and this pin, when lever 40 is in a horizontal position, projects through an aperture 43 formed in the wall of sleeve 34. A spiral of closely spaced holes 44, as perhaps best seen in FIG. 1, is drilled in barrel 2 at a point immediately below the base of ballast element 3 to allow for variations in the length of core retainer 26, and release pin 42 also projects through one of these holes. It will be appreciated that when pin 42 is in the position shown in FIG. 3, the core liner apparatus 19 is locked in place and cannot be moved upwardly or withdrawn from barrel 2. Attached to the long arm of lever 40 is one end of line 18, the other end of which is secured to the nylon-knotted bag 24, or any other suitable point on float 17. It will be recognized that when any upward force is applied to line 18, lever 40 rotates counterclockwise about stub shaft 41 and release pin 42 moves to the right, as seen in FIG. 3. When release pin 42 is so displaced, any further upward force exerted along line 18 results in the extraction of the core liner ssembly 19 from the expendable portion 1 of the corer.

However, as will be seen hereinafter, before any tension can be applied to this line, float 17, after its release, must move upwardly a predetermined amount to take up the slack of its coiled turns, and the time it takes to move this distances constitutes the time delay of the release mechanism. When line 18 comes tight the rapidly rising float 17 is suddenly stopped and to its static upward pull on line 18 is added an additional force due to the inertia of 17. This additional force aids in detaching the base of the core sample from the sediment. Thus, the core liner assembly 19 is withdrawn from casing 2 only after a given time interval has passed after impact.

As perhaps best seen in FIG. 2, tether line 18 is made sufficiently long so as to permit an intermediate portion thereof to be coiled at 45, and this coil is fastened to shell housing 6 by a rubber band 46 which is stretched between a pair of spaced vertical slots leading down from the rim of this housing.

To prepare the corer for operation, the following procedure is followed. First, the core retainer 26, with core catcher 27 and liner release 28 attached, is inserted into barrel 2 and orientated so that liner release pin 42 is aligned with one of the holes 44 near the top of the casing. This pin can have a threaded hole cut in its exposed end and a screw can be threaded into this hole at this time to pull the release pin to the position shown in FIG. 3, thereby securing the liner assembly 19 in place. This screw, which may be left in the release pin as a safety measure, must, of course, be removed before launching.

Next, float 24, as seen in FIG. 2, is placed inside shell housing 6, and loop 25 of the nylon net bag 24 slipped over finger 10 on the float release lever 9. A hollow, rubber ball 47 is jammed into handhole 7, holding lever 9 in the horizontal position shown in FIG. 2. The excess length of nylon tether 18 is coiled and secured to shell 6 by rubber band 46 which can be looped through two slots cut through the top of this shell. This arrangement prevents the tether line from fouling before the release of the float.

In one preferred embodiment of the invention as alluded to hereinbefore, a mercury switch was used in the electronic flashing unit 22 accommodated within sphere 20, and this unit was kept inoperative until launching by proper orientation during stowage. Assembled in this manner, the free-fall corer is now ready for launching and can be stored in this condition.

The operation of the device is relatively simple. After the sampler is dropped free at the sea surface, it descends to a depth of about ten meters and, at this point, rubber ball 47 becomes compressed and floats out of handhole 7, thereby arming the various releases of the sampler.

As the assembly falls through the water, of course, three forces act upon it, namely, the downward force due to its weight acting at the center of gravity, the buoyancy force acting at the center of buoyancy and the drag acting at the cener of drag. The weight and buoyancy forces combine to act at a "center of net downwards force." Even if the apparatus of the present invention is dropped in a horizontal attitude, the center of drag is always above the center of net downwards force and, consequently, the assembly turns nose down and falls in a stable attitude. During the descent, of course, pilot weight 12 counteracts the buoyant force of float 17 and maintains float release lever 9 in a horizontal position until shortly after bottom contact.

As the unit accelerates, the upward drag force increases with the square of the velocity until it equals the net downwards force. The terminal velocity in the case of one embodiment was about 450 meters per minute, and it remained essentially unchanged until the corer reached the bottom, regardless of depth. Of course, during descent, the water drag is also acting on pilot weight 12. However, its weight in water is greater than the drag so that it does not rise during descent.

When the sampler strikes bottom, first nosepiece 13 and then core barrel 2 enters the sediment and the assembly immediately starts to decelerate. Pilot weight 12 next hits the sediment and, as the drag on this weight increases, it, in effect, slides upwardly along the core barrel. The tension on release wire 11 is thus reduced and float 17 raises release lever 9. Loop 25, which heretofore has restrained this float, slips off hook 10 on the release lever, and the float assembly rises free of protective shell 6.

As core barrel 2 penetrates the sediment layer and the core sample is forced into liner 26, the water in this liner is expelled from the top through check valve 35. When the sampler comes to rest in the sediment, float 17 is still accelerating upwardly. As mentioned hereinbefore, tether line 18, because of its coiled condition, constitutes a time delay. This line is pulled free from rubber band 46, uncoils, becomes taut, and then pulls on the core liner release lever 40 shortly after penetration has ceased. Lever 40 responds to this force by pivoting in a counterclockwise direction and pulling release pin 42 out of the hole 44 in casing 2. Thereafter, the upward force is transferred to the core liner assembly 19. The static buoyant force of float 17 plus the force due to its inertia serve to part the core sample from the sediment at the bottom of the core liner. Core catcher 27 and the action of check valve 35 thereafter retain the core sample in the liner.

As the liner is withdrawn, water, of course, flows into the narrow annulus between core barrel 2 and liner 19. The speed with which the linear is withdrawn at this time is relatively low because of the resistance of the water which must flow into the interior of the corer. However, once the liner is free of the core barrel, the float accelerates upwardly with the core liner assembly 19 in tow. When the payload reaches terminal velocity, it continues to rise to the surface at a constant rate. Once it reaches the surface, the unit can be readily retrieved by locating the flashing float.

It would be noted in connection with the operation of the corer that liner 19 preferably should be secured by tether 18 to the nylon net at a location adjacent empty glass sphere 21, as illustrated in FIG. 1. If this is done, then the weight of the core liner when it is at the surface will tend to elevate the other glass sphere 20, thereby improving the visibility of the flasher accommodated therein.

Also, the check valve in the liner release portion of the liner may be replaced with a shutoff valve. Such a valve would insure a free flow of seawater through the interior of the apparatus during its descent. Additionally, it would better protect against any entry of water into the liner when the recoverable portion of the unit is at the surface and subjected to wave action.

As far as the operation of this valve is concerned, it should be set to an open condition during the descent phase of the sampling operation and its closure member mechanically coupled by suitable linkage to either lever 40 or pin 42, for example. In this way, the valve would be closed and spring-latched shut simultaneously with the release of the linear and its preparation for withdrawal.

The use of the apparatus hereinbefore described is not restricted to merely obtaining sediment cores and the like. Rather, it can be used to also procure core samples of certain types of soft rock formations where the hardness of the material is not too great. When sampling such formations, cylindrical casing 6 may have secured to its outer wall a multiplicity of small fins or vanes to impart to the corer a rotational motion about its vertical axis as it descends to the ocean floor. More specifically, these fins should be secured adjacent the open end of this housing and the plane of each fin should make a small, acute angle with the vertical. The spinning thus procured, of course, further stabilizes the device during its descent and improves its performance. Also, when fins are used, the leading edge of the nosepiece can be serrated or otherwise provided with cutting teeth to assist the aparatus in penetrating relatively hard materials.

In the modification of FIG. 1, the ballast element is in the form of an iron mass. Instead of using a solid structure here, this member may be fabricated in the form of an enlarged shell-like compartment, and this compartment can be originally left empty and filled with concrete prior to the field use of the apparatus.

Obviously many modifications and variations of the present invention are possible in the light of the above teachings. It is therefore to be understood that within the scope of the appended claims the invention may be practiced otherwise than as specifically described.

What is claimed is:

1. Free-fall apparatus for procuring a core sample of the ocean bottom comprising, in combination,
   a first elongated tubular member;
   a second elongated tubular member disposed within said first tubular member;
   a latch mounted adjacent one end of said second tubular member;
       said latch locking said tubular members together to prevent relative longitudinal movement therebetween when a control element thereof is placed in a first position and unlocking said tubular members when an upward force is applied to said control element;
   an annular-shaped heavy mass affixed to one end of said first tubular member;
   a float tied to the control element of said latch;
   means for hooking said float to said heavy mass to prevent said float from ascending therefrom during the descent of said tubular members to the ocean bottom and for unhooking said float from said heavy mass when said other end of said first tubular member impacts against the ocean bottom and pierces the sediment layer whereby said float thereupon ascends within the ocean, applies an upward force to the control element of said latch to unlock said second tubular member from said first tubular member and thereafter raises it to the surface.

2. In an arrangement as defined in claim 1,
   a check valve mounted in said second tubular member adjacent said one end thereof for permitting water to flow out from the interior of said second tubular member when said other end of said first tubular member pierces the ocean bottom and a core sample is forced into the other end of said second tubular element.

3. In an arrangement as defined in claim 1 wherein said means for hooking and unhooking said float to said heavy mass includes
   a pilot weight concentrically positioned about said first tubular member adjacent said other end thereof and adapted to be displaced therealong when said first tubular member pierces the sediment layer;
       said pilot weight insuring that said first and second tubular members fall in a vertical condition when locked together and dropped free at the ocean surface.

4. In an apparatus as defined in claim 1 wherein
   said float is tied to the control element of said latch by a tether line which is held in a coiled condition during the descent of said tubular members to the ocean bottom;
   said tether line, as it uncoils in response to the ascension of said float, functioning as a time delay mechanism whereby said float must ascend a given distance before it can apply an upward force to said control element, unlock said tubular members and withdraw said second tubular member from said first tubular member.

5. In an arrangement as defined in claim 1 wherein said float comprises
   a pair of hollow glass cylinders and
   a knitted fabric bag enclosing said cylinders and maintaining them in a side-by-side relationship.

6. In an arrangement as defined in claim 5 wherein a battery-operated light source is accommodated in one of said spheres.

7. A freely descending and ascending core sampler for oceanographic investigations comprising, in combination,
   a first elongated tubular member;
   a second elongated tubular member disposed within said first tubular member;
   a latch mechanism mounted adjacent one end of said second tubular member,
      said latch mechanism having a first position whereat it locks said tubular members together and prevents relative longitudinal movement therebetween and a second position whereat said tubular members are unlocked and can experience relative longitudinal movement;
   a float tied to said latch and adapted to operate said latch from said first to said second position as it ascends within the ocean;
   a heavy mass secured to one end of said first tubular member for overcoming the positive buoyancy of said float whereby whenever said tubular members and said float are dropped free at the ocean surface they descend rapidly to the ocean bottom;
   a cylindrical shell surmounting said heavy mass for providing a housing for said float during said descent;
   means for latching said float to said heavy mass to prevent said float from ascending therefrom during said descent and for unlatching said float when said other end of said first tubular member impacts against the ocean bottom and pierces the sediment layer,
      said float after being unlatched freely ascending within the ocean, then operating said latch from said first to said second position and thereafter withdrawing said second tubular member from said first tubular member and bringing it to the surface.

8. In an arrangement as defined in claim 7 wherein said means for latching and unlatching said float to said heavy mass includes
   a float release lever pivotally mounted on said heavy mass;
   said float being hooked to said float release lever when said lever is in a horizontal attitude and becoming unhooked when said lever is allowed to rotate upwardly towards a vertical attitude;
   a pilot weight slidably mounted on said first tubular member and suspended from one extremity of said float release lever to a point adjacent said other end of said first tubular member,
      said pilot weight maintaining said float release lever in a horizontal attitude during the descent of said first and second tubular members and additionally insuring that said tubular members fall vertically when dropped free at the ocean surface.

9. In an arrangement as defined in claim 8 wherein the end of said float release lever from which said pilot weight is suspended extends through an aperture in said cylindrical shell and
   a collapsible sphere jammed into said aperture and locking said float release in a horizontal attitude,
      said sphere collapsing when it reaches a predetermined depth whereby said float release lever becomes unlocked and the apparatus armed for operation.

10. A freely descending and ascending sampler for obtaining cores of the ocean bottom comprising, in combination,
    a first elongated tubular member;
    a second elongated tubular member disposed within said first tubular member;
    means for locking said first and second tubular members together to prevent relative longitudinal movement therebetween;
    a heavy mass affixed symmetrically about one end of said first tubular member;
    a pilot weight suspended at the other end of said first tubular member,
       said pilot weight being adapted to move upwardly along said first tubular member when said other end of said first tubular member encounters the ocean bottom after free descent through the ocean and enters the sediment layer;
    and means responsive to the upward movement of said pilot weight for thereafter unlocking said first and second tubular members and for withdrawing said second tubular member from said first tubular member and raising said second tubular member to the ocean surface.

11. In an arrangement as defined in claim 10 wherein said last-mentioned means includes
    a float;
    means for latching said float to the heavy mass affixed about one end of said first tubular member;
    a length of line tying said float to one end of said tubular member;
    said pilot weight being suspended from said latching means whereby whenever said pilot weight moves upwardly along said first tubular member said float is unlatched from said heavy mass and freely ascends within the ocean, the upward movement of said float unlocking said first and second tubular members and providing the buoyancy necessary to raise said first tubular member to the surface.

12. A free fall corer device for procuring samples of the ocean bottom comprising, in combination,
    a first elongated tubular member;
    a second elongated tubular member disposed within said first tubular member;
    means for latching said second tubular member to said first tubular member thereby to prevent relative longitudinal movement therebetween;
    a float tied to one end of said second tubular member for returning said second tubular member to the surface after a core sample has been procured;
    a heavy mass secured symmetrically about one end of said first tubular member to overcome the positive buoyancy of said float whereby whenever said tubular members and said float are dropped free at the ocean surface they rapidly descend to the ocean bottom;
    a cylindrical pilot weight positioned at the other end of said first tubular member,
       said pilot weight insuring that the first and second tubular members remain in a vertical attitude during their rapid descent to the ocean bottom;
       said pilot weight being adapted to move upwardly along said first elongated tubular member whenever said one end of said first tubular member strikes the ocean bottom and proceeds to enter the sediment layer;
    and means responsive to the upward movement of said pilot weight for releasing said latching means a predetermined time after said one end of said first tubular member strikes the ocean bottom, thereby to permit said float to withdraw said second tubular member from said first tubular member and return said first tubular member to the surface.

13. A free-fall coring device for procuring samples of the ocean bottom comprising, in combination,
    a first elongated tubular element;

a second elongated tubular element disposed within said first tubular element;

means for latching said second tubular element to said first tubular element thereby to prevent relative longitudinal movement therebetween;

a float tied to one end of said second tubular member for returning said second tubular member to the surface after a sample has been procured;

a heavy mass symmetrically fastened about one end of said first tubular member to overcome the positive buoyancy of said float whereby when said tubular members and said float are dropped free at the surface they descend rapidly to the ocean bottom;

means for hooking said float to said heavy mass during the descent of said first and second tubular members;

means operative upon the impact of the other end of said first tubular member against the ocean bottom and the entry of an adjacent portion of said first tubular member into the sediment layer for unhooking said float, said means for unhooking said float including a pilot weight concentrically mounted on said first tubular member and capable of longitudinal displacement therealong, said pilot weight being suspended adjacent said other end of said first tubular member during the descent of said first tubular member and insuring that the said first tubular member falls in a vertical manner with said other end thereof downward;

and means operative by the upward force produced by the ascension of said float for unlatching said second tubular member from said first tubular member.

References Cited
UNITED STATES PATENTS

| | | | |
|---|---|---|---|
| 3,078,931 | 2/1963 | Moore | 175—5 |
| 3,295,616 | 1/1967 | Charlton et al. | 175—5 |

LOUIS R. PRINCE, *Primary Examiner.*

S. CLEMENT SWISHER, *Examiner.*